United States Patent
Ko

(10) Patent No.: US 10,739,876 B2
(45) Date of Patent: *Aug. 11, 2020

(54) INTERACTIVE SYSTEM AND HANDHELD DEVICE THEREOF

(71) Applicant: PixArt Imaging Inc., Hsin-Chu County (TW)

(72) Inventor: Yi-Hsien Ko, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,856

(22) Filed: Jul. 15, 2019

(65) Prior Publication Data
US 2019/0339792 A1 Nov. 7, 2019

Related U.S. Application Data

(63) Continuation of application No. 15/682,688, filed on Aug. 22, 2017, now Pat. No. 10,409,400.

(30) Foreign Application Priority Data

Apr. 6, 2017 (TW) .............................. 106111535 A

(51) Int. Cl.
| | |
|---|---|
| *G06F 3/038* | (2013.01) |
| *G06F 3/041* | (2006.01) |
| *G06F 3/0346* | (2013.01) |
| *G06F 3/03* | (2006.01) |
| *G06F 1/16* | (2006.01) |
| *G06F 1/3234* | (2019.01) |

(52) U.S. Cl.
CPC ............ *G06F 3/0383* (2013.01); *G06F 1/163* (2013.01); *G06F 1/1694* (2013.01); *G06F 1/325* (2013.01); *G06F 3/0304* (2013.01); *G06F 3/0346* (2013.01); *G06F 3/041* (2013.01); *G06F 2203/0384* (2013.01)

(58) Field of Classification Search
CPC .... G06F 3/0383; G06F 3/0304; G06F 3/0346; G06F 3/041; G06F 1/163; G06F 1/1694; G06F 1/325

See application file for complete search history.

(56) References Cited

U.S. PATENT DOCUMENTS

| | | | | |
|---|---|---|---|---|
| 2002/0058459 A1* | 5/2002 | Holt | ....................... | A63H 33/00 446/484 |
| 2005/0260986 A1* | 11/2005 | Sun | ....................... | G06F 3/0386 455/433 |
| 2006/0028446 A1* | 2/2006 | Liberty | .................... | G06F 3/017 345/158 |
| 2010/0134308 A1* | 6/2010 | Barnardo | .............. | G06F 1/3203 340/670 |
| 2013/0168538 A1* | 7/2013 | Liang | ...................... | G01S 3/781 250/226 |
| 2014/0362210 A1* | 12/2014 | Huang | .................. | G08C 23/04 348/114 |
| 2017/0276304 A1* | 9/2017 | Domingo | .............. | F21V 23/003 |

* cited by examiner

*Primary Examiner* — Ariel A Balaoing
(74) *Attorney, Agent, or Firm* — Hauptman Ham, LLP

(57) ABSTRACT

There is provided a handheld device for an interactive system. The handheld device identifies the timing that a user operates the handheld device to determine whether to turn on an indicating light for optical sensing to avoid the unnecessary power consumption.

19 Claims, 3 Drawing Sheets

INTERACTIVE SYSTEM AND HANDHELD DEVICE THEREOF

CROSS REFERENCE TO RELATED APPLICATION

This application is a continuation application of U.S. patent application Ser. No. 15/682,688 filed on, Aug. 22, 2017, which claims the priority benefit of Taiwan Patent Application Serial Number 106111535, filed on Apr. 6, 2017, the full disclosures of which are incorporated herein by reference.

BACKGROUND

1. Field of the Disclosure

This disclosure generally relates to an interactive system, more particularly, to an interactive system and a handheld method thereof that effectively reduce the power consumption.

2. Description of the Related Art

If an interactive system (e.g., a virtual reality system or an interactive pointing system) employs the optical sensing technique to detect the movement of an object (e.g., a handheld device), a light source may be disposed on the object so as to enhance the optical sensing efficiency for the object. For example, an infrared light source is directly disposed on the object.

However, as a power source of a handheld device is generally an embedded power source (e.g., a battery) and the light source can consume a large amount of electricity, the handheld device for the interactive system generally adopts a battery with a large capacity. Accordingly, the volume and weight of the handheld device cannot be reduced significantly.

Accordingly, it is required to provide an interactive system with low power consumption.

SUMMARY

The present disclosure provides an interactive system and a handheld device thereof that reduce the total power consumption.

The present disclosure provides a handheld device for an interactive system. The handheld device includes a light source, an operation detector and a controller. The operation detector is configured to detect whether the handheld device is being operated, wherein the light source is turned on after the operation detector is turned on and then detects the handheld device being operated. The controller is electrically coupled to the light source and the operation detector, and configured to control an emission period of the light source according to a sensing signal of the operation detector The handheld being operated is referred to that the handheld device is picked up by a user to have accelerations (e.g., detected sensing signals) or the handheld device is touched by the user to generate touch signals (e.g., detected sensing signals).

The present disclosure further provides a handheld device for an interactive system. The handheld device includes a light source, an operation detector and a controller. The operation detector is configured to detect whether the handheld device is being operated, wherein the light source is turned on according to a sensing signal from the operation detector after the operation detector is turned on and then detects the handheld device being operated. The controller is configured to control the light source to turn on for a predetermined period of time and then turn off when the handheld device starts to operate.

The present disclosure further provides an interactive system including a wearable device and a handheld device. The wearable device is configured to send a wakeup signal. The handheld device includes a main body, a light source, an operation detector and a controller. The main body is configured to be held by a user. The light source is arranged on the main body. The operation detector is configured to detect whether the handheld device is being operated, wherein when the operation detector is turned on, the light source is not turned on instantly, and the light source is turned on when the operation detector detects the handheld device being operated. The controller electrically coupled to the light source and the operation detector, and configured to control an emission period of the light source according to a sensing signal of the operation detector.

In one embodiment, the interactive device is, for example, a wearable device, and the handheld device is, for example, a mobile phone or a remote controller.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is adaptable to an interactive system. Generally, the interactive system includes an interactive device and a handheld device. The handheld device is held by a user or fastened to the body of the user using a fastening such as a tying tape or a binding band. The interactive device detects the movement of the handheld device such that the user is provided to control the interactive device by operating the handheld device.

In one embodiment, the interactive device is a wearable device and used to be arranged on a user's body or worn by a user. The interactive device has an image display, or is wired or wirelessly coupled to an external image display.

The interactive device at least includes an optical image sensor, and the handheld device correspondingly has a light source to be detected by the optical image sensor. The optical image sensor captures image frames containing an image of the light source to detect the imaging feature (e.g., the position, shape, size, brightness, color, illumination period and so on) of the light source in the captured image frames to allow the user to accordingly control the interactive device. Preferably, to avoid the interference from ambient light, the optical image sensor detects light of a specific wavelength (e.g., infrared light) through a filter, and the light source provides the light of said specific wavelength (e.g., an infrared light source for providing infrared light). The optical image sensor is, for example, a CCD image sensor or a CMOS image sensor, but not limited thereto.

Figure 1:
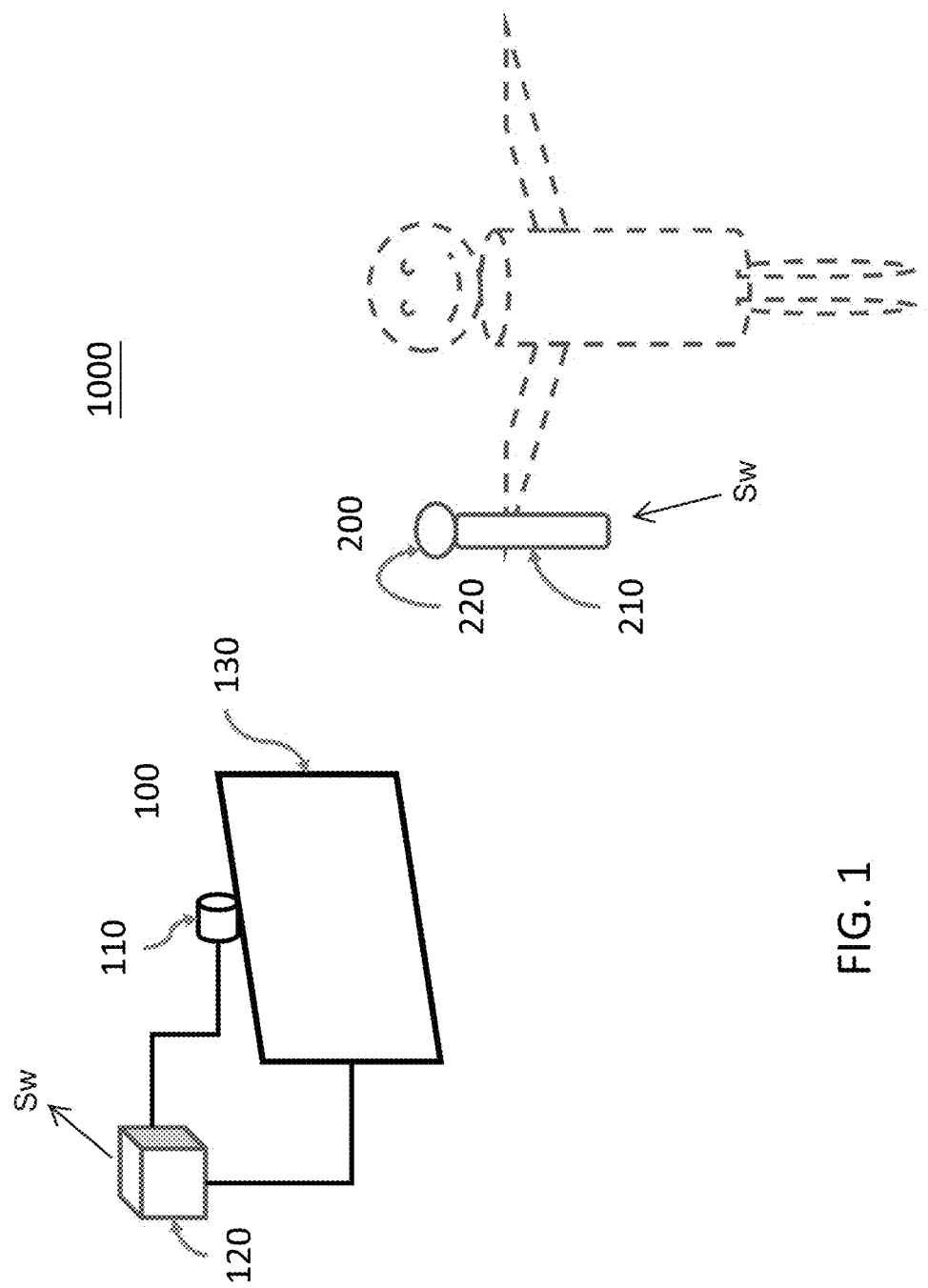
FIG. 1 is a schematic system diagram of an interactive system according to one embodiment of the present disclosure.

Referring to FIG. 1, it is a schematic system diagram of an interactive system according to one embodiment of the present disclosure, wherein the interactive system 1000 includes an interactive device 100 and a handheld device 200. The interactive device 100 includes an optical image sensor 110, an interactive host 120 and an image display 130, and the handheld device 200 includes a main body 210 and a light source 220. As shown in FIG. 1, the light source 220 is arranged on the main body 210.

The interactive host 120 receives the imaging feature of the light source 220 of the handheld device 200 detected by the optical image sensor 110. The interactive host 120 further receives a control command from the handheld device 200 through a wireless communication interface (not shown in figures), and controls the application program or interactive games on the image display 130 according to the imaging feature, the control command or a combination thereof. For example, the image display 130 shows interactive pictures according to the image frames acquired by the optical image sensor 110.

Figure 2:
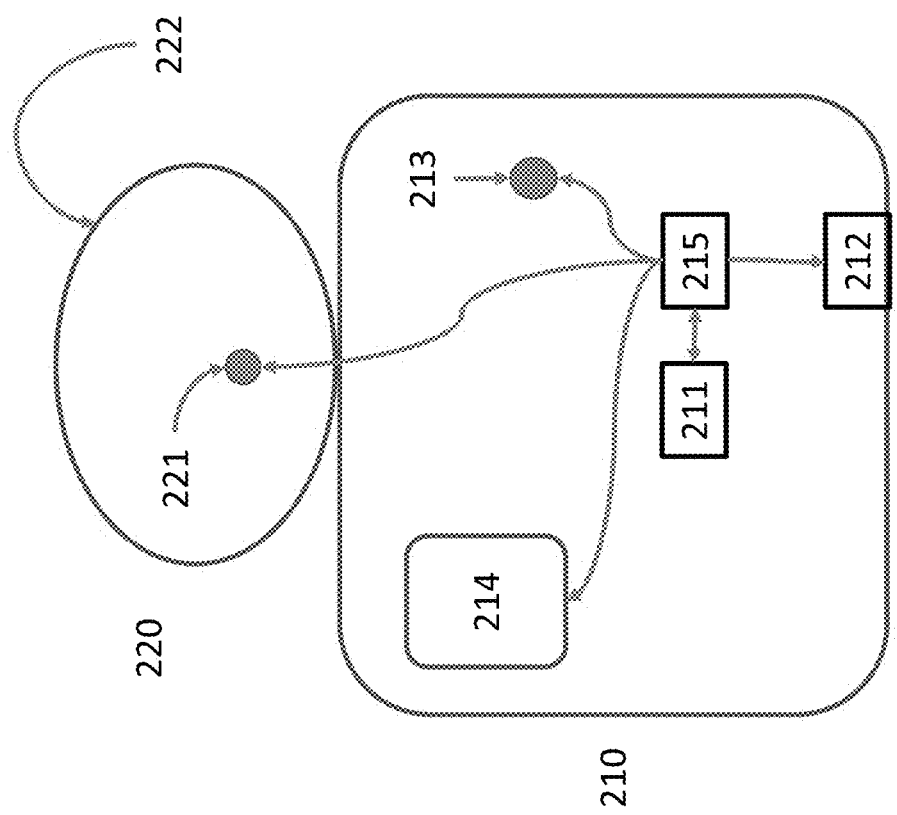
FIG. 2 is a hardware block diagram of a handheld device according to one embodiment of the present disclosure.

Referring to FIG. 2, it is a hardware block diagram of a handheld device 200 according to one embodiment of the present disclosure. The main body 210 of the handheld device 200 includes a battery 211, a communication interface 212, an accelerometer 213, a touch panel 214 and a controller 215. The light source 220 has an illumination device 221 and a transparent housing 222. The transparent housing 222 is arranged outside of the illumination device 221 to protect the illumination device 221.

The controller 215 is, for example, a central processing unit (CPU), a microcontroller (MCU) or an application specific integrated circuit (ASIC). The controller 215 is electrically coupled to the communication interface 212, the light source 220, the accelerometer 213 and the touch panel 214, and communicates with the interactive device 100 through the communication interface 212. The controller 215 also controls whether to provide the electricity from the battery 211 to the illumination device 221 according to the sensing signals of the accelerometer 213 and/or the touch panel 214.

In other words, the accelerometer 213 and the touch panel 214 are used as operation detectors for detecting whether the handheld device 200 is being operated or not. The controller 215 is used to control the light source 220 according to the sensing signal of the operation detector. When the handheld device 200 is not being operated, the light source 220 is lighted off to reduce the power consumption.

In one embodiment, the main body 210 has a recess (now shown in figures) to allow the user to hold the main body 210 more comfortable, or has an elastic band, groove or other fixing material for the user to hold or for being fixed on a part of the user's body (e.g., the ankle) to perform the operation.

The battery 211 is used to provide electricity respectively required by the components in the main body 210 and the light source 220 during operation. The communication interface 212 is used to perform the wireless communication with the interactive host 120, e.g., using the short distance communication technology such as Bluetooth, near field communication (NFC) or WiFi. The accelerometer 213 is used to detect the movement of the main body 210 and generate sensing signals. It is possible to replace the accelerometer 213, based on the cost and requirement, by a gyro or other inertial sensors as long as the movement of the main body 210 itself is detectable. The touch panel 214 is provided as a command input or operating interface for the user and generates sensing signals. It is possible to replace the touch panel 214, based on the cost and requirement, by mechanical button or other command input devices as long as the user is able to input control commands by finger pressing/sliding. The controller 215 is used to receive the sensing signals from the accelerometer 213 and the touch panel 214 to accordingly generate a control command, and the control command is provided to the interactive host 120 via the communication interface 212.

In other words, in the present disclosure, the operation detector is at least one of the accelerometer 213 and the touch panel 214, and used to detect whether the handheld device 200 is being operated. The controller 215 then controls the light source 220 (more specifically the illumination device 221) according to the sensing signal detected by the operation detector. To reduce the power consumption, the light source 220 is not instantly turned on when the operation detector is turned on to perform the detection; and the light source 220 is turned on only when the operation detector detects that the handheld device 200 is being operated, wherein the light source 220 not being turned on herein refers to that the electricity from the battery 211 is not provided to the light source 220.

The illumination device 221 is selected from a single emission component (e.g., LED) or formed by a plurality of emission components. To generate light of a specific wavelength, the illumination device 221 is used to directly emit light of the specific wavelength, or the transparent housing 222 filters the light emitted by the illumination device 221 to generate the light of said specific wavelength. For example, the illumination device 221 is an infrared light source for emitting infrared light, and the transparent housing 22 is transparent only to infrared light or transparent to both visible light and infrared light; or, the illumination device 221 emits both visible light and infrared light and the illumination device 222 is transparent only to infrared light. The transparent housing 222 is a hollow component or a sphere tightly wrapping around the illumination device 221 without any space therebetween as long as the transparent housing 222 has the feature to allow the light of said specific wavelength to penetrate. To improve the sensing effect of the optical image sensor 110, the transparent housing 222 preferably has a spherical shape and diffuses light emitted from the illumination device 221 such that the optical image sensor 110 has a substantially identical imaging effect when observing the light source 220 from different angles. Said substantially identical imaging effect mentioned herein is referred to having substantially identical sizes, brightness, shapes, colors, emission periods and so on.

When the interactive system 1000 is activated or turned on, said interactive device 100 awakes the handheld device 200 through the communication interface thereof, e.g., sending a wakeup signal Sw for being received by the communication interface 212 of the handheld device 220. However, when the interactive system 1000 is turned on, it is not sure whether a user is going to operate the handheld device 200, e.g., the user using other input devices or another identical handheld device (i.e. the interactive system 1000 having several identical handheld devices). Accordingly, the controller 215 of the handheld device 200 is not necessary to turn on all components but only to turn on the operation detector (e.g., the accelerometer 213 and/or the touch panel 214) for detecting the operation of a user and keeps other components being turned off. The controller 215 identifies that whether the user is operating the handheld device 200 according to the sensing signals of the accelerometer 213 and/or the touch panel 214. When the handheld device 200 is confirmed to be operated by the user, the light source 110 is turned on. However, when the handheld device 200 is not being operated, the light source 220 is not turned on or not lighted so as to reduce the power consumption of the handheld device 200.

In one embodiment, when the handheld device 200 starts to operate (e.g., startup, wakeup or power on), the controller 215 controls the light source 220 (more specifically the illumination device 221) to turn on for a predetermined period of time (e.g., 1 to 2 seconds) and then to turn off for indicating that the handheld device 200 is ready for operation without considering the sensing signals from the accelerometer 213 or the touch panel 214. For example, the accelerometer 213 or the touch panel 214 is activated (e.g., powered on or outputting sensing signals) after the light source 220 is turned off from the short-term emission after the handheld device 200 starts to operate. Then, the light source 220 is turned on or lighted again only when the handheld device 200 is being operated.

In another embodiment, the accelerometer 213 or the touch panel 214 is activated simultaneously when the handheld device 200 starts to operate. The controller 215 controls the light source 220 to turn on for said predetermined period of time, and if the controller 215 receives valid sensing signals from the accelerometer 213 or the touch panel 214, the controller 215 controls the light source 220 to emit light continuously from the short-term emission instead of being turned off at first and then turned on again.

In other words, the interactive device 100 is used to generate a wakeup signal Sw. When the handheld device 200 receives the wakeup signal Sw through the communication interface 212 to be awaked, only the operation detector is turned on but the light source 220 is not turned on instantly. The controller 215 controls the light source 220 to emit light with a predetermined feature after the controller 215 receives the sensing signal from the accelerometer 213 and/or the touch panel 214 and identifies that the handheld device 200 is being operated.

In some embodiments, after the controller 215 turns on the light source 220 and when the controller 215 does not receive any valid sensing signal for a predetermined time interval (indicating that the operation detector does not detect the handheld device 200 being operated), the light source 220 is turned off. The light source 220 is turned on again till the controller 215 receives the valid sensing signal again. The valid sensing signal herein refers to a value thereof exceeding a predetermined value or a predetermined range.

When the handheld device 200 is awaken, the controller 215 provides the electricity from the battery 211 to the accelerometer 213 and/or the touch panel 214 only but not instantly provide the electricity to the illumination device 221. The electricity from the battery 211 is provided to the illumination device 221 only when it is confirmed that the accelerometer 213 senses the handheld device 200 being moved (e.g., the detected acceleration value exceeding a predetermined range or predetermined value) and/or the touch panel 214 senses a touch input (e.g., detecting contact of one or multiple objects). In one embodiment, it is possible to implement the providing and not providing the electricity using switching devices, a multiplexer or other suitable circuits without particular limitations.

The controller 215 further adjusts the emission features, e.g., the shape, size, brightness, color, emission period and so on, of the illumination device 221 according to the sensing signal of the accelerometer 213 and/or the touch panel 214 to accordingly allow the interactive host 120 to identify the imaging feature (e.g., the position, shape, size, brightness, color, emission period and so on) of the illumination device 221 in the images captured by the optical image sensor 110 to further control the interactive device 100 accordingly. The control of the interactive device 100 is, e.g., controlling pictures shown on and sounds played by a speaker of the image display 130 by the interactive host 120. The interactive host 120 includes, for example, a central processing unit (CPU) used to control the interactive pictures according to the imaging feature of the light source 220 in the captured images.

Figure 3:
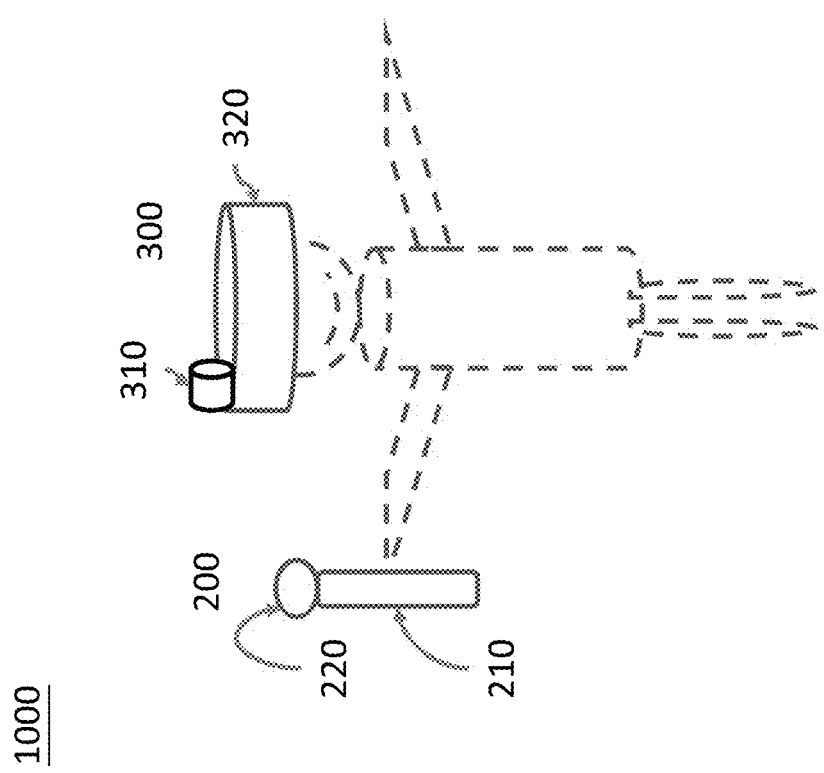
FIG. 3 is a schematic system diagram of an interactive system according to another embodiment of the present disclosure.

In another embodiment, the interactive device is directly used as a wearable device to be arranged on the user's body, e.g. a head mounted device arranged on the user's head. Referring to FIG. 3, it is a schematic system diagram of the interactive device of an interactive system mounted on a user's head according to one embodiment of the present disclosure. In this embodiment, an interactive device 300 is arranged on the user's head, and the handheld device 200 is similar to those shown in FIGS. 1 and 2 and thus details thereof are not repeated herein.

In this embodiment, the interactive device 300 includes an optical image sensor 310 and an interactive host 320. The optical image sensor 310 is disposed on the interactive host 320 or integrated in the casing of the interactive host 320. The optical image sensor 310 and the interactive host 320 in FIG. 3 are similar to the optical image sensor 110 and the interactive host 120 shown in the embodiment of FIG. 1. The inner layer of the interactive host 320 has a display (not shown) opposite to user's eyes for providing the same function of the image display 130 shown in the embodiment of FIG. 1. In another embodiment, the interactive device 300 sends control or image/audio signals to an external image display, which has the same function of the image display 130, through wired or wireless technology, to reduce the weight of the interactive device 300.

In the system arrangement of FIGS. 1 and 3, the handheld device 200 uses its accelerometer 213 and/or the touch panel 214 to detect whether the user is operating the handheld device 200 and further determines whether to provide power to and activate the illumination device 221. In this way, the power consumption of the handheld device 200 is reduced and the accidental activation of the light source 200 which causes undesired light interference is avoided.

It should be mentioned that a number of the components in the drawings of the present disclosure is only intended to illustrate but not to limit the present disclosure. For example, it is possible that the handheld device 200 includes several touch panels 214, several accelerometers 213 and/or several illumination devices 211 to perform the operations mentioned above depending on different applications.

It should be mentioned that although FIG. 2 is illustrated as hardware block diagram, in some embodiments the controller 215 of FIG. 2 includes software codes and/or hardware codes to perform the above operations. The method of integrating software codes and/or hardware codes in the controller 215 is known to the art and thus details thereof are not described herein.

As mentioned above, the light source of a handheld device can consume most of the system power, and thus how to reduce the total power consumption of a handheld device is an important issue. Therefore, the present disclosure provides an interactive system (FIGS. 1 and 3) and a handheld device thereof (FIG. 2) that provide an operation detector on the handheld device as a mechanism for confirming whether the handheld device is being operated. When the handheld device is not being operated, a light source of the handheld device is not lighted to reduce the power consumption; and the light source of the handheld device is lighted only when the handheld device is being operated.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A handheld device for an interactive system, the handheld device comprising:
    a light source;
    an operation detector configured to detect whether the handheld device is being operated, wherein
        the light source is turned on once the operation detector detects an acceleration value exceeding a predetermined value, and
        when the handheld device is powered on, electricity is not provided to the light source before the operation detector detects the acceleration value exceeding the predetermined value; and
    a controller electrically coupled to the light source and the operation detector, and configured to control an emission period of the light source according to a sensing signal of the operation detector.

2. The handheld device as claimed in claim 1, wherein the operation detector is at least one of an accelerometer and a touch panel.

3. The handheld device as claimed in claim 1, further comprising a communication interface configured to receive a wakeup signal to turn on the operation detector.

4. The handheld device as claimed in claim 1, wherein the controller is further configured to control at least one of a size, a shape and brightness of light emitted by the light source.

5. The handheld device as claimed in claim 1, wherein the light source comprises an illumination device and a transparent housing which is arranged outside of the illumination device,
    the illumination device is an infrared light source, and
    the transparent housing is transparent to visible light and infrared light.

6. The handheld device as claimed in claim 1, wherein the light source comprises an illumination device and a transparent housing which is arranged outside of the illumination device,
    the illumination device is configured to emit visible light and infrared light, and
    the transparent housing is transparent only to the infrared light.

7. A handheld device for an interactive system, the handheld device comprising:
    a light source;
    an operation detector configured to detect whether the handheld device is being operated, wherein the light source is turned on according to a sensing signal from the operation detector once the operation detector detects an acceleration value exceeding a predetermined value; and
    a controller configured to control the light source to turn on for a predetermined period of time and then turn off when the handheld device starts to operate.

8. The handheld device as claimed in claim 7, wherein the light source is turned on again after the light source is turned off after the predetermined period of time when the turned-on operation detector detects the handheld device being operated.

9. The handheld device as claimed in claim 7, wherein the light source is turned on for the predetermined period of time and then turned off irrelevant to the sensing signal from the operation detector.

10. The handheld device as claimed in claim 7, wherein the operation detector is at least one of an accelerometer and a touch panel.

11. The handheld device as claimed in claim 7, further comprising a communication interface configured to receive a wakeup signal to turn on the operation detector.

12. The handheld device as claimed in claim 7, wherein the controller is further configured to control at least one of a size, a shape and brightness of light emitted by the light source.

13. The handheld device as claimed in claim 7, wherein the light source comprises an illumination device and a transparent housing which is arranged outside of the illumination device,
    the illumination device is an infrared light source, and
    the transparent housing is transparent to visible light and infrared light.

14. The handheld device as claimed in claim 7, wherein the light source comprises an illumination device and a transparent housing which is arranged outside of the illumination device,
    the illumination device is configured to emit visible light and infrared light, and
    the transparent housing is transparent only to the infrared light.

15. An interactive system, comprising:
    a wearable device configured to send a wakeup signal; and
    a handheld device, comprising:
        a main body configured to be held by a user;
        a light source arranged on the main body;
        an operation detector configured to detect whether the handheld device is being operated, wherein when the handheld device is turned on, the light source is not provided electricity before the operation detector detects an acceleration value exceeding a predetermined value, and the light source is turned on once the operation detector detects the acceleration value exceeding the predetermined value, and
        a controller electrically coupled to the light source and the operation detector, and configured to control an emission period of the light source according to a sensing signal of the operation detector.

16. The interactive system as claimed in claim 15, wherein the wearable device comprises an optical image sensor configured to capture images of the light source.

17. The interactive system as claimed in claim 15, wherein after the light source is turned on and when the operation detector does not detect the handheld device being operation for a time interval, the light source is turned off.

18. The interactive system as claimed in claim 15, wherein the operation detector is at least one of an accelerometer and a touch panel.

19. The interactive system as claimed in claim 15, wherein the handheld device further comprises a battery, and the light source not being turned on is referred to that electricity from the battery is not provided to the light source.

\* \* \* \* \*